United States Patent
Chendamarai Kannan et al.

(10) Patent No.: US 10,334,546 B2
(45) Date of Patent: Jun. 25, 2019

(54) SYNCHRONIZATION SIGNALING COORDINATION FOR CO-EXISTENCE ON A SHARED COMMUNICATION MEDIUM

(71) Applicant: QUALCOMM Incorporated, San Diego, CA (US)

(72) Inventors: Arumugam Chendamarai Kannan, San Diego, CA (US); Tao Luo, San Diego, CA (US); Ahmed Kamel Sadek, San Diego, CA (US); Nachiappan Valliappan, San Diego, CA (US); Chirag Sureshbhai Patel, San Diego, CA (US); Mingxi Fan, San Diego, CA (US); Tamer Adel Kadous, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 26 days.

(21) Appl. No.: 15/250,392

(22) Filed: Aug. 29, 2016

(65) Prior Publication Data
US 2017/0064657 A1 Mar. 2, 2017

Related U.S. Application Data

(60) Provisional application No. 62/212,436, filed on Aug. 31, 2015.

(51) Int. Cl.
| | |
|---|---|
| H04W 56/00 | (2009.01) |
| H04W 16/14 | (2009.01) |
| H04L 5/00 | (2006.01) |

(52) U.S. Cl.
CPC ......... *H04W 56/0015* (2013.01); *H04L 5/005* (2013.01); *H04W 16/14* (2013.01); *H04W 56/002* (2013.01)

(58) Field of Classification Search
None
See application file for complete search history.

(56) References Cited

U.S. PATENT DOCUMENTS

| | | | | |
|---|---|---|---|---|
| 2009/0080407 | A1* | 3/2009 | Onggosanusi | ........ H04L 5/0007 370/350 |
| 2010/0317343 | A1 | 12/2010 | Krishnamurthy et al. | |

(Continued)

FOREIGN PATENT DOCUMENTS

| | | |
|---|---|---|
| GB | 2512127 A | 9/2014 |
| WO | 2008042865 A2 | 4/2008 |

OTHER PUBLICATIONS

Partial International Search Report—PCT/US2016/049773—ISA/EPO—dated Nov. 14, 2016.

(Continued)

*Primary Examiner* — Diane L Lo
(74) *Attorney, Agent, or Firm* — Muncy, Geissler, Olds & Lowe, P.C.

(57) ABSTRACT

Techniques for synchronization on a shared communication medium are disclosed. An access point may select, for example, a common sequence, frequency, and time for a first synchronization signal that is coordinated with one or more other access points. The access point may then transmit the first synchronization signal in accordance with the common sequence, frequency, and time. An access terminal may receive, from an access point, a first synchronization signal having a first sequence and a second synchronization signal having a second sequence. The access terminal may then determine an offset in time between the first synchronization signal and the second synchronization signal, and determine a cell identifier group associated with the access point based on the offset.

39 Claims, 10 Drawing Sheets

(56) References Cited

U.S. PATENT DOCUMENTS

| | | | | |
|---|---|---|---|---|
| 2012/0040691 A1* | 2/2012 | Han | ................ | G01S 1/042 |
| | | | | 455/456.1 |
| 2014/0355522 A1* | 12/2014 | Diab | ................ | H04W 88/06 |
| | | | | 370/328 |
| 2017/0111880 A1* | 4/2017 | Park | ................ | H04W 64/00 |
| 2017/0237463 A1* | 8/2017 | Zheng | ................ | H04W 56/00 |
| | | | | 370/328 |

OTHER PUBLICATIONS

International Search Report and Written Opinion—PCT/US2016/049773—ISA/EPO—dated Feb. 28, 2017.

\* cited by examiner

SYNCHRONIZATION SIGNALING COORDINATION FOR CO-EXISTENCE ON A SHARED COMMUNICATION MEDIUM

CROSS-REFERENCE TO RELATED APPLICATIONS

The present application claims the benefit of U.S. Provisional Application No. 62/212,436, entitled "Synchronization Signaling Coordination for Co-Existence on a Shared Communication Medium," filed Aug. 31, 2015, assigned to the assignee hereof and expressly incorporated herein by reference in its entirety.

INTRODUCTION

Aspects of this disclosure relate generally to telecommunications, and more particularly to operations on a shared communication medium and the like.

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and others. These systems are often deployed in conformity with specifications such as Long Term Evolution (LTE) provided by the Third Generation Partnership Project (3GPP), Ultra Mobile Broadband (UMB) and Evolution Data Optimized (EV-DO) provided by the Third Generation Partnership Project 2 (3GPP2), 802.11 provided by the Institute of Electrical and Electronics Engineers (IEEE), etc.

In cellular networks, "macro cell" access points provide connectivity and coverage to a large number of users over a certain geographical area. A macro network deployment is carefully planned, designed, and implemented to offer good coverage over the geographical region. To improve indoor or other specific geographic coverage, such as for residential homes and office buildings, additional "small cell," typically low-power access points have recently begun to be deployed to supplement conventional macro networks. Small cell access points may also provide incremental capacity growth, richer user experience, and so on.

Small cell LTE operations, for example, have been extended into the unlicensed frequency spectrum such as the Unlicensed National Information Infrastructure (U-NII) band used by Wireless Local Area Network (WLAN) technologies. This extension of small cell LTE operation is designed to increase spectral efficiency and hence capacity of the LTE system. However, it may also encroach on the operations of other Radio Access Technologies (RATs) that typically utilize the same unlicensed bands, most notably IEEE 802.11x WLAN technologies generally referred to as "Wi-Fi."

SUMMARY

The following summary is an overview provided solely to aid in the description of various aspects of the disclosure and is provided solely for illustration of the aspects and not limitation thereof.

In one example, a communication method is disclosed. The method may include, for example, selecting, at an access point, a common sequence, frequency, and time for a first synchronization signal that is coordinated with one or more other access points; and transmitting, from the access point, the first synchronization signal in accordance with the common sequence, frequency, and time.

In another example, a communication apparatus is disclosed. The apparatus may include, for example, at least one processor, at least one memory coupled to the at least one processor, and at least one transceiver. The at least one processor and the at least one memory may be configured to select, at an access point, a common sequence, frequency, and time for a first synchronization signal that is coordinated with one or more other access points. The at least one transceiver may be configured to transmit, from the access point, the first synchronization signal in accordance with the common sequence, frequency, and time.

In another example, another communication apparatus is disclosed. The apparatus may include, for example, means for selecting, at an access point, a common sequence, frequency, and time for a first synchronization signal that is coordinated with one or more other access points; and means for transmitting, from the access point, the first synchronization signal in accordance with the common sequence, frequency, and time.

In another example, a transitory or non-transitory computer-readable medium is disclosed. The computer-readable medium may include, for example, code for selecting, at an access point, a common sequence, frequency, and time for a first synchronization signal that is coordinated with one or more other access points; and code for transmitting, from the access point, the first synchronization signal in accordance with the common sequence, frequency, and time.

In another example, another communication method is disclosed. The method may include, for example, receiving, from an access point, a first synchronization signal having a first sequence; receiving, from the access point, a second synchronization signal having a second sequence; determining an offset in time between the first synchronization signal and the second synchronization signal; and determining a cell identifier group associated with the access point based on the offset.

In another example, another communication apparatus is disclosed. The apparatus may include, for example, at least one transceiver, at least one processor, and at least one memory coupled to the at least one processor. The at least one transceiver may be configured to receive, from an access point, a first synchronization signal having a first sequence, and receive, from the access point, a second synchronization signal having a second sequence. The at least one processor and the at least one memory may be configured to determine an offset in time between the first synchronization signal and the second synchronization signal, and determine a cell identifier group associated with the access point based on the offset.

In another example, another communication apparatus is disclosed. The apparatus may include, for example, means for receiving, from an access point, a first synchronization signal having a first sequence; means for receiving, from the access point, a second synchronization signal having a second sequence; means for determining an offset in time between the first synchronization signal and the second synchronization signal; and means for determining a cell identifier group associated with the access point based on the offset.

In another example, a transitory or non-transitory computer-readable medium is disclosed. The computer-readable medium may include, for example, code for receiving, from an access point, a first synchronization signal having a first sequence; code for receiving, from the access point, a second synchronization signal having a second sequence; code for determining an offset in time between the first synchronization signal and the second synchronization signal; and code for determining a cell identifier group associated with the access point based on the offset.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

The present disclosure relates generally to enhancing the reliability of synchronization signaling on a shared communication medium. To facilitate system acquisition and measurement reporting, for example, synchronization signaling may be coordinated among neighboring access points such as those deployed by a common operator. The coordinated synchronization signaling may include a common synchronization signal that is coordinated in sequence, frequency, and time, as well as individual synchronization signals that differ from access point to access point. The individual synchronization signals may be sent at different times (referred to herein as position modulation) to restore or enhance cell identifier diversity. The individual synchronization signals may also use a sequence value that is outside of a set of values recognized by legacy access terminals to avoid confusion.

More specific aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

Figure 1:
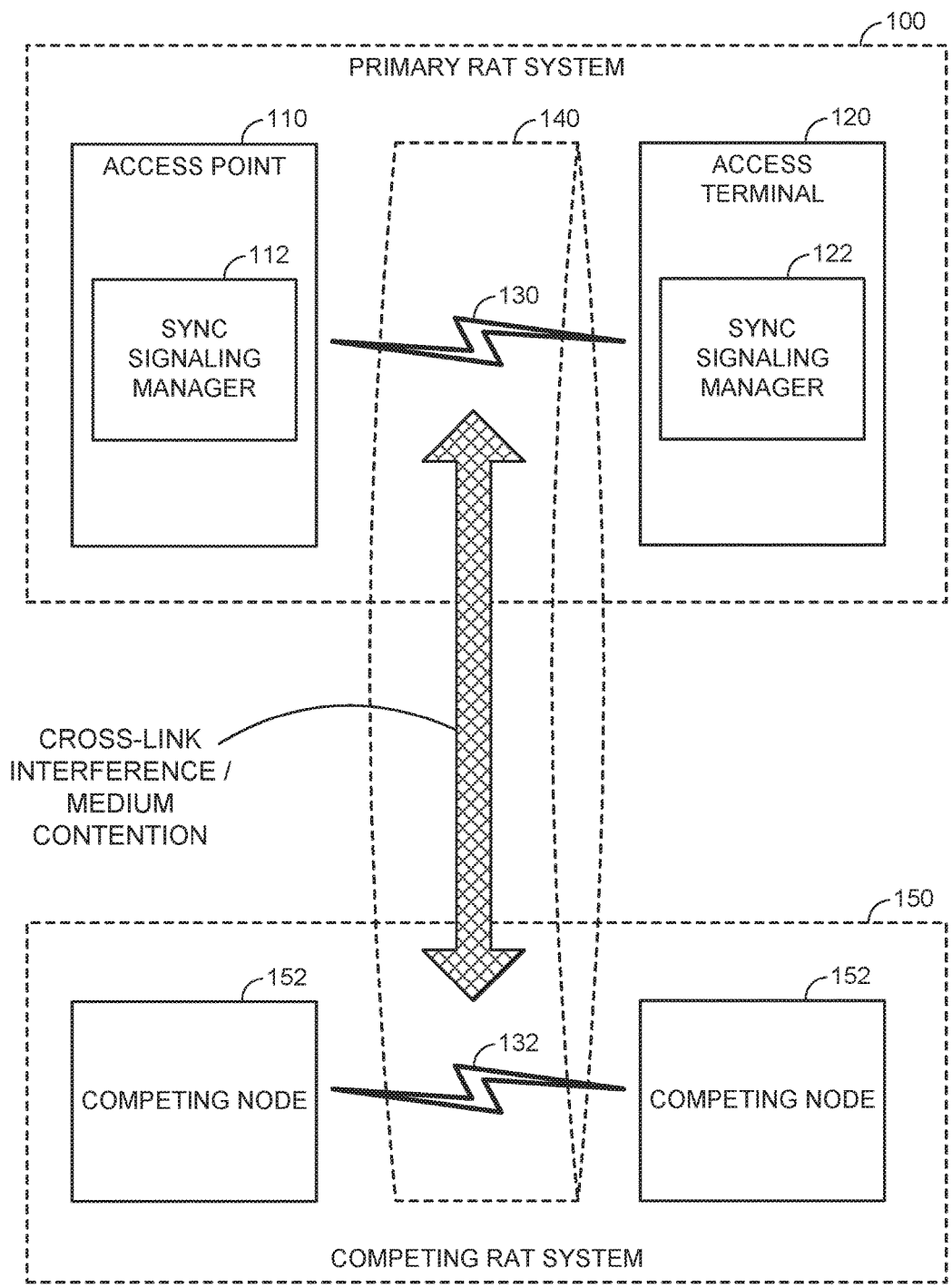
FIG. 1 is a system-level diagram illustrating an example wireless network environment.

FIG. 1 is a system-level diagram illustrating an example wireless network environment, shown by way of example as including a "primary" Radio Access Technology (RAT) system 100 and a "competing" RAT system 150. Each system may be composed of different wireless nodes generally capable of receiving and/or transmitting over a wireless link, including information related to various types of communication (e.g., voice, data, multimedia services, associated control signaling, etc.). The primary RAT system 100 is shown as including an access point 110 and an access terminal 120 in communication with each other over a wireless link 130. The competing RAT system 150 is shown as including two competing nodes 152 in communication with each other over a separate wireless link 132, and may similarly include one or more access points, access terminals, or other types of wireless nodes. As an example, the access point 110 and the access terminal 120 of the primary RAT system 100 may communicate via the wireless link 130 in accordance with Long Term Evolution (LTE) technology, while the competing nodes 152 of the competing RAT system 150 may communicate via the wireless link 132 in accordance with Wi-Fi technology. It will be appreciated that each system may support any number of wireless nodes distributed throughout a geographic region, with the illustrated entities being shown for illustration purposes only.

Unless otherwise noted, the terms "access terminal" and "access point" are not intended to be specific or limited to any particular RAT. In general, access terminals may be any wireless communication device allowing a user to communicate over a communications network (e.g., a mobile phone, router, personal computer, server, entertainment device, Internet of Things (IOT)/Internet of Everything (IOE) capable device, in-vehicle communication device, etc.), and may be alternatively referred to in different RAT environments as a User Device (UD), a Mobile Station (MS), a Subscriber Station (STA), a User Equipment (UE), etc. Similarly, an access point may operate according to one or several RATs in communicating with access terminals depending on the network in which the access point is deployed, and may be alternatively referred to as a Base Station (BS), a Network Node, a NodeB, an evolved NodeB (eNB), etc. Such an access point may correspond to a small cell access point, for example. "Small cells" generally refer to a class of low-powered access points that may include or be otherwise referred to as femto cells, pico cells, micro cells, Wireless Local Area Network (WLAN) access points, other small coverage area access points, etc. Small cells may be deployed to supplement macro cell coverage, which may cover a few blocks within a neighborhood or several square miles in a rural environment, thereby leading to improved signaling, incremental capacity growth, richer user experience, and so on.

Returning to FIG. 1, the wireless link 130 used by the primary RAT system 100 and the wireless link 132 used by the competing RAT system 150 may operate over a shared communication medium 140. A communication medium of this type may be composed of one or more frequency, time, and/or space communication resources (e.g., encompassing one or more channels across one or more carriers). As an example, the communication medium 140 may correspond to at least a portion of an unlicensed frequency band. Although different licensed frequency bands have been reserved for certain communications (e.g., by a government entity such as the Federal Communications Commission (FCC) in the United States), some systems, in particular those employing small cell access points, have extended operation into unlicensed frequency bands such as the Unlicensed National Information Infrastructure (U-NII) band used by WLAN technologies including Wi-Fi.

Due to the shared use of the communication medium 140, there is the potential for cross-link interference between the wireless link 130 and the wireless link 132. Further, some RATs and some jurisdictions may require contention or "Listen Before Talk (LBT)" for access to the communication medium 140. As an example, a Clear Channel Assessment (CCA) protocol may be used in which each device verifies via medium sensing the absence of other traffic on a shared communication medium before seizing (and in some cases reserving) the communication medium for its own transmissions. In some designs, the CCA protocol may include distinct CCA Preamble Detection (CCA-PD) and CCA Energy Detection (CCA-ED) mechanisms for yielding the communication medium to intra-RAT and inter-RAT traffic, respectively. The European Telecommunications Standards Institute (ETSI), for example, mandates contention for all devices regardless of their RAT on certain communication media such as unlicensed frequency bands.

As will be described in more detail below, the access point 110 and/or the access terminal 120 may be variously configured in accordance with the teachings herein to provide or otherwise support the synchronization signaling coordination techniques discussed briefly above. For example, the access point 110 may include a synchronization signaling manager 112 and the access terminal 120 may include a synchronization signaling manager 122. The synchronization signaling manager 112 and/or the synchronization signaling manager 122 may be configured in different ways to manage access to the communication medium 140.

Figure 2:
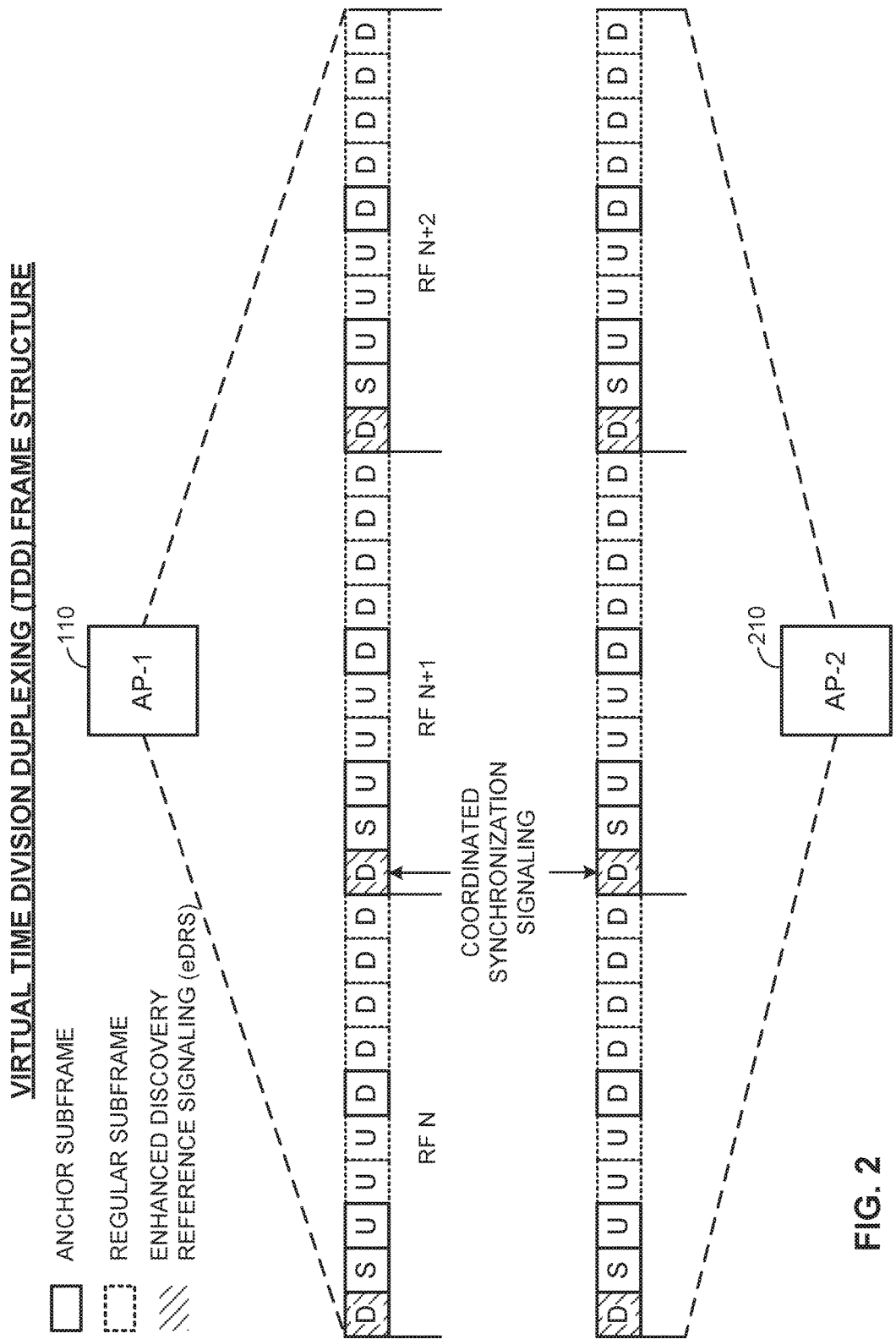
FIG. 2 illustrates an example virtual Time Division Duplexing (TDD) frame structure.

FIG. 2 illustrates an example virtual Time Division Duplexing (TDD) frame structure that may be implemented for the primary RAT system 100 on the communication medium 140 to facilitate contention-based access between the access point 110/access terminal 120 and the competing RAT system 150. For illustration purposes, the access point 110 (AP-1) is shown as part of a coordinated system that includes another access point 210 (AP-2) operating in accordance with the same frame structure. The access point 110 and the access point 210 may be provided by the same operator, for example.

The illustrated frame structure includes a series of radio frames (RFs) that are numbered in accordance with a system frame number numerology (RF N, N+1, N+2, etc.) and divided into respective subframes (SFs), which may also be numbered for reference (e.g., SF0, SF1, etc.). As an example, the LTE frame structure includes system frames that are divided into 1024 numbered radio frames composed of 10 subframes each, which together constitute an system frame cycle (e.g., lasting 10.24 s for 10 ms radio frames having 1 ms subframes). The use of a frame structure may provide more natural and efficient coordination among devices than more ad hoc signaling techniques.

The example frame structure of FIG. 2 is TDD in that each subframe may be variously operated at different times as a downlink (D), uplink (U), or special (S) subframe. In general, downlink subframes are reserved for transmitting downlink information from the access point 110 to the access terminal 120, uplink subframes are reserved for transmitting uplink information from the access terminal 120 to the access point 110, and special subframes may include a downlink portion and an uplink portion separated by a guard period. Different arrangements of downlink, uplink, and special subframes may be referred to as different TDD configurations. Returning to the LTE example above, the TDD variant of the LTE frame structure includes 7 TDD configurations (TDD Config 0 through TDD Config 6), with each configuration having a different arrangement of downlink, uplink, and special subframes. For example, some TDD configurations may have more downlink subframes and some may have more uplink subframes to accommodate different traffic scenarios. In the illustrated example of FIG. 2, a TDD configuration is employed that is similar to TDD Config 3 in LTE. The particular TDD configuration employed may be broadcast by the access point 110 using a System Information Block (SIB) message, a new physical channel to indicate the TDD frame format in the control region, or the like (e.g., a SIB-1 message in LTE).

Although each TDD configuration is different, there may be one or more subframes that are the same across all TDD configurations. These subframes are referred to herein as anchor subframes. Returning again to the LTE example above, the subframe SF0 is a downlink subframe, SF1 is a special subframe, SF2 is an uplink subframe, and SF5 is a downlink subframe in each radio frame across each of the TDD configurations TDD Config 0 through TDD Config 6. In the illustrated example, the anchor subframes similarly correspond to the subframes SF0, SF1, SF2, and SF5 of each radio frame, although it will be appreciated that the specific anchor carrier designations may vary across different systems.

The example frame structure of FIG. 2 is virtual in that each subframe may or may not be occupied by primary RAT signaling in any given instance due to the contention procedure for accessing the communication medium 140. In general, if the access point 110 or the access terminal 120 fails to win contention for a given subframe that subframe may be silenced.

As is further illustrated in FIG. 2, one or more subframes may be designated to include what is referred to herein as Enhanced Discovery Reference Signaling (eDRS). The eDRS may be configured to convey select control signaling for facilitating system operation. The control signaling may include information relevant to timing synchronization, system acquisition, interference measurements (e.g., Radio Resource Measurements (RRM)/Radio Link Measurements (RLM)), tracking loops, gain control (e.g., Automatic Gain Control (AGC)), paging, etc. For example, the eDRS may include a Primary Synchronization Signal (PSS), a Secondary Synchronization Signal (SSS) a Cell-specific Reference Signal (CRS), a Channel State Information Reference Signal (CSI-RS), a Master Information Block (MIB) signal, a System Information Block (SIB) signal, a Paging Channel (PCH) signal, a Random Access Channel (RACH) signal, and various combinations thereof.

To help ensure that system acquisition and measurement reporting by the access terminal 120 proceed in a timely and efficient manner, the coverage and robustness of certain primary RAT synchronization signaling such as PSS/SSS may be increased over the communication medium 140. For example, in addition or as an alternative to boosting or repeating respective synchronization signaling at the access point 110, synchronization signaling may be coordinated with other primary RAT access points such as the other access point 210. In the example of FIG. 2, the access point 110 and the other access point 210 each send coordinated synchronization signaling common to both access points at one or more designated opportunities (with one instance being shown by way of example). In this way, a single frequency network (SFN) effect can be created at the access terminal 120, in which the different transmissions of the synchronization signaling will appear as a resolvable multipath signal (provided that the delay spread caused by propagation is less than, for example, the associated cyclic prefix (CP)).

Coordinated synchronization signaling may be particularly suitable for a shared communication medium deployment of the type described above where interference from other-RAT devices such as the competing RAT system 150 as well as from other primary RAT operators may substantially impede the periodicity and fidelity of synchronization signaling. It will be appreciated, however, that the coordinated synchronization signaling techniques provided herein are not limited to any particular operating environment and may be applied in a variety of scenarios in which improved coverage and robustness are desired.

Figure 3:
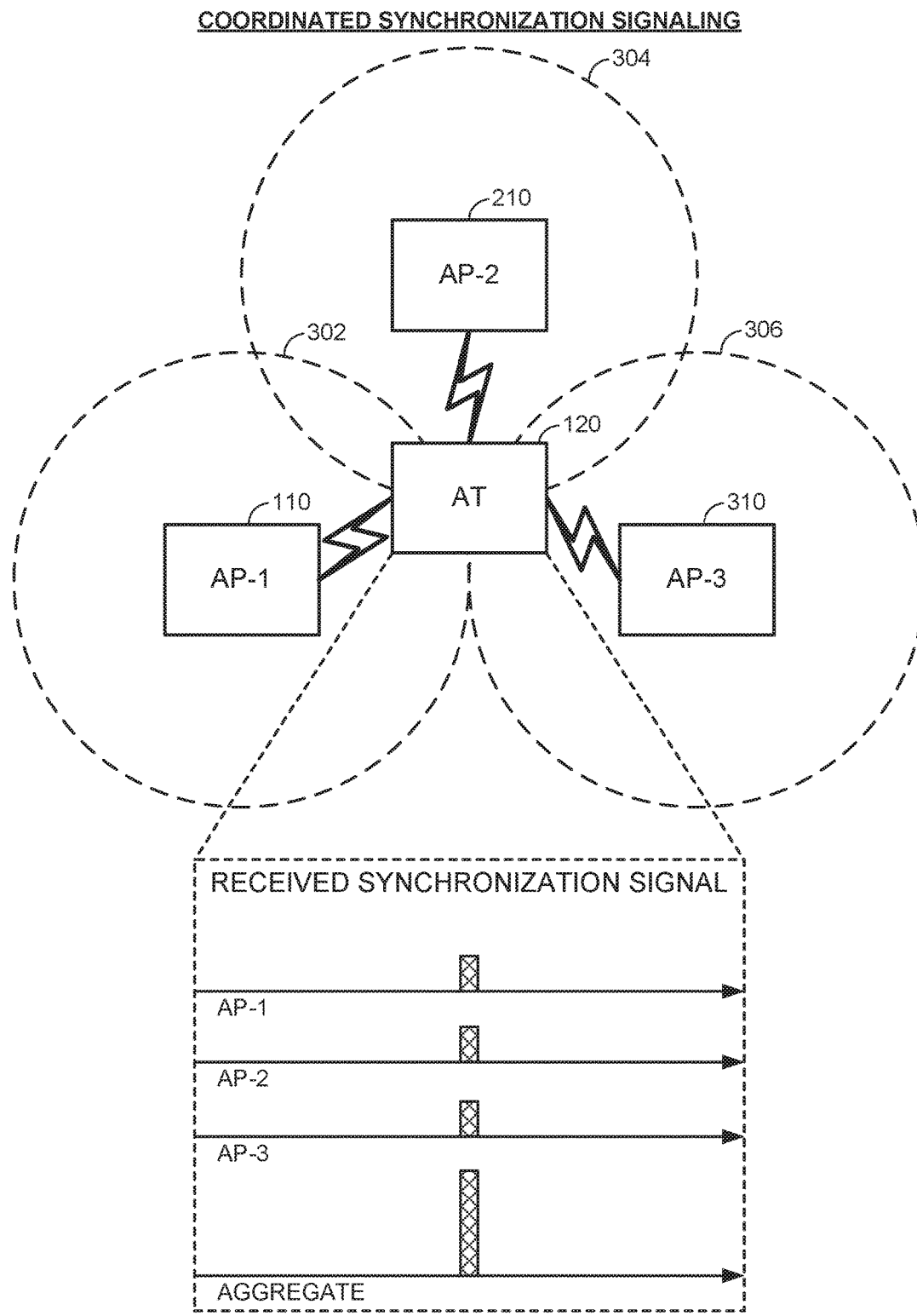
FIG. 3 is a system-level diagram illustrating an example of coordinated synchronization signaling among access points deployed by a common operator.

FIG. 3 is a system-level diagram illustrating an example of coordinated synchronization signaling among access points deployed by a common operator. In this example, the access point 110 (AP-1) is shown as being deployed in conjunction with the other access point 210 (AP-2) as well as still another access point 310 (AP-3) for illustrations purposes. Each of the access points 110, 210, and 310 provides communication services over a respective coverage area 302, 304, and 306 in the vicinity of the access terminal 120.

As shown, each of the access points 110, 210, and 310 may broadcast a common synchronization signal such as PSS that (i) uses a common sequence, (ii) is transmitted at a common time, and (iii) is transmitted on a common frequency to achieve the aforementioned SFN effect. The access terminal 120 may accordingly receive the individual synchronization signaling transmissions in a substantially coherent manner such that the aggregate received signal corresponds to the sum of the signaling energies from each of the access points 110, 210, and 310. Even if none of the synchronization signaling energies from any of the access points 110, 210, and 310 is individually capable of demodulation, the aggregate received signal may be sufficient to facilitate successful acquisition.

Although use of a common sequence for the PSS, for example, of each of the access points 110, 210, and 310 may reduce the space of available cell identifiers (e.g., Physical Cell ID (PCI) mapping to PSS/SSS) compared to designs in which each of the access points 110, 210, and 310 may transmit a unique or semi-unique sequence (e.g., as in LTE where typically 3 PSS sequences are used), the space of available cell identifiers may be expanded in other ways to restore or enhance cell identifier diversity. For example, rather than relying on sequence modulation to distinguish PSS among the access points 110, 210, and 310, a position modulation scheme may be introduced to provide distinguishable PSS via time diversity.

Figure 4:
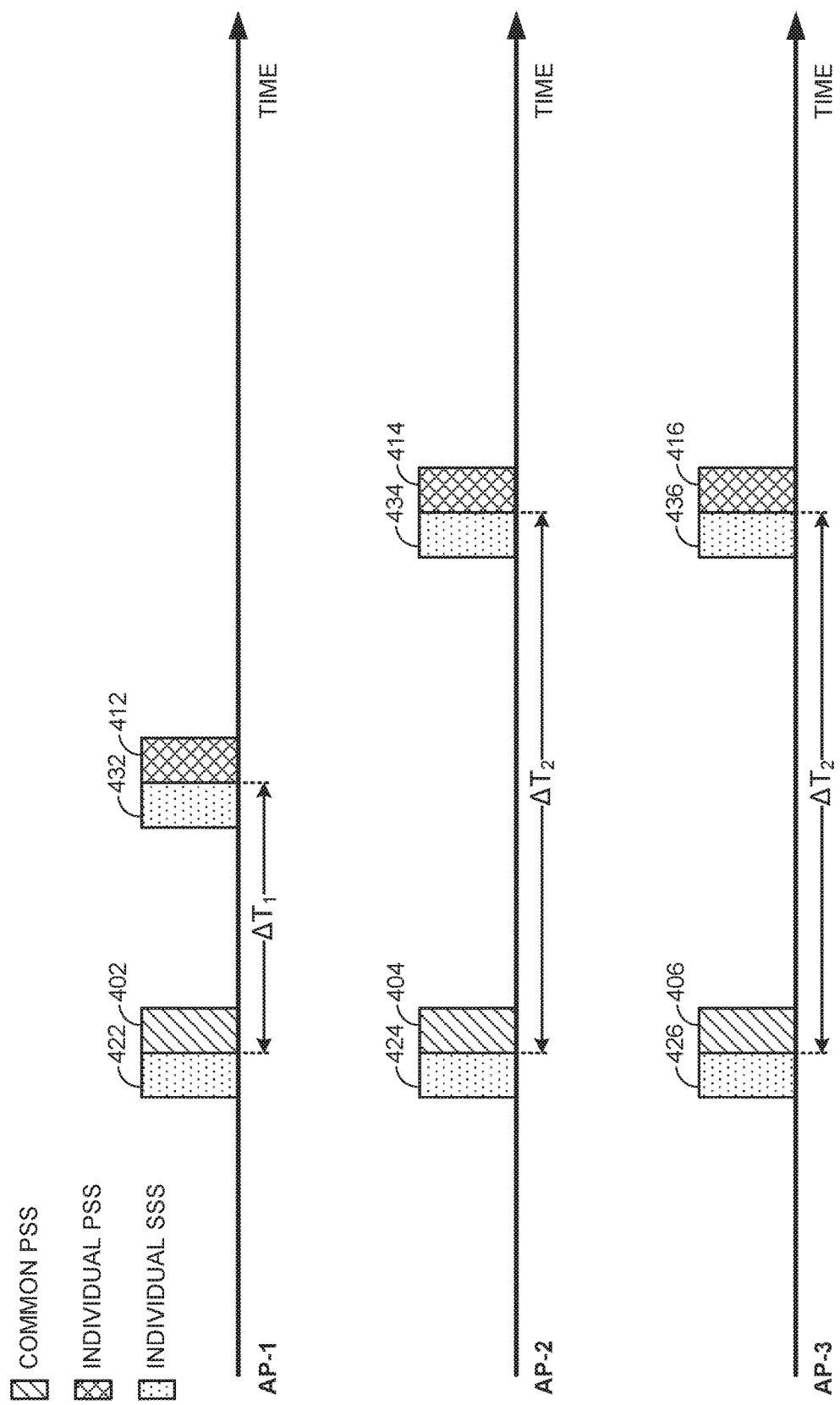
FIG. 4 is a timing diagram illustrating an example scheme for synchronization signaling among access points deployed by a common operator.

FIG. 4 is a timing diagram illustrating an example scheme for synchronization signaling among access points deployed by a common operator. In this example, the access point 110 (AP-1) is again deployed as in FIG. 3 with the other access point 210 (AP-2) and the still other access point 310 (AP-3) for illustrations purposes.

As shown, each of the access points 110, 210, and 310 may initially broadcast a common synchronization signal such as a common PSS as described above with reference to FIG. 3. In particular, the access point 110 may transmit a first synchronization signal 402, the access point 210 may transmit a first synchronization signal 404, and the access point 310 may transmit a first synchronization signal 406, with the first synchronization signals 402, 404, and 406 being sent in accordance with a common sequence, time, and frequency.

In addition, each of the access points 110, 210, and 310 may subsequently transmit an individual synchronization signal at different times following the common synchronization signal. In particular, the access point 110 may transmit a second synchronization signal 412, the access point 210 may transmit a second synchronization signal 414, and the access point 310 may transmit a second synchronization signal 416. The second synchronization signals 412, 414, and 416 may use a common sequence with respect to each other but a different sequence with respect to the first synchronization signals 402, 404, and 406 to differentiate common synchronization signal instances from individual synchronization signal instances.

Although they may be sent with a common sequence, the second synchronization signals 412, 414, and 416 may be sent at different positions in time (referred to herein as "position modulation") such that they are offset from the first synchronization signals 402, 404, and 406 by a corresponding offset $\Delta T$. By identifying the offset $\Delta T$ of each of the second synchronization signals 412, 414, and 416 from the first synchronization signals 402, 404, and 406, the access terminal 120 may classify each of the access points 110, 210, and 310 into a corresponding cell identifier group having a characteristic offset $\Delta T_i$. The cell identifier groups may be associated with respective sets of cell identifiers and thereby used to expand the space of available cell identifiers as desired.

The cell identifier group and corresponding offset value $\Delta T_i$ for each of the access points 110, 210, and 310 may be determined in different ways. For example, each of the access points 110, 210, and 310 may maintain a mapping table of cell identifier groups to corresponding offset values $\Delta T_i$ and may determine its cell identifier group as a function of its cell identifier (cell_id) according to the following equation:

$$\text{Cell Identifier Group } \{1, \ldots N\} = \text{cell\_id mod } N \quad \text{(Eq. 1)}$$

Here, N is the number of cell identifier groups desired by a network administrator. In the illustrated example, N=2 and the access point 110 has an even-numbered cell_id whereas the access points 210, 310 have a respective odd-numbered cell_id for illustration purposes. Accordingly, the second synchronization signal 412 of the access point 110 is offset from the first synchronization signal 402 by a first offset $\Delta T_1$ and the second synchronization signals 414 and 416 of the access points 210 and 310 are offset from the first synchronization signals 404 and 406 by a second offset $\Delta T_2$. By selecting a larger or smaller number N of cell identifier groups, the corresponding space of available cell identifiers may be expanded or reduced as desired.

It will be appreciated that a single instance of the second synchronization signals 412, 414, and 416 is shown for illustration purposes, but that additional instances may be sent as well for additional processing gain.

Returning to FIG. 4, each of the synchronization signals 402, 404, 406, 412, 414, and 416 may be accompanied by respective auxiliary synchronization signals 422, 424, 426, 432, 434, and 436 to convey additional synchronization information. In the illustrated example, each of the synchronization signals 402, 404, 406, 412, 414, and 416 are shown by way of example as PSS and each of the auxiliary synchronization signals 422, 424, 426, 432, 434, and 436 are shown by way of example as SSS. In general, the access terminal 120 may detect a physical layer identity group from PSS—via position information as described above—and a physical layer cell identity from SSS in combination with PSS. The auxiliary synchronization signals 422, 424, 426, 432, 434, and 436 are therefore unique as between the access points 110, 210, and 310. Because the access points 210 and 310 utilize the same offset value $\Delta T_2$, there may be a collision between the auxiliary synchronization signals 434 and 436. Nevertheless, the auxiliary synchronization signals 434 and 436 may be resolved based on their unique values as between the access points 210 and 310. While the auxiliary synchronization signals 434 and 436 in the illustrated example may collide, the corresponding primary synchronization signals 414 and 416 may benefit from synchronization via the SFN effect. The tradeoff between auxiliary synchronization signal collision and primary synchronization signal enhancement may be set or adapted by the access points 110, 210, and 310, or a centralized controller thereof, and may vary from application to application.

In some deployments, there may be certain (legacy) access terminals that are not configured to understand a position modulation scheme for synchronization signaling of the type described above. In order to avoid confusing such legacy access terminals while additionally identifying itself in this regard to other access terminals such as the access terminal 120, the access points 110, 210, and 310 may use a special sequence for the second synchronization signals 412, 414, and 416. For example, the second synchronization signals 412, 414, and 416 may correspond to a Chu sequence or the like that is selected to be outside of the sequence space recognized by legacy access terminals.

In some instances, however, it may be desirable for such legacy access terminals to be able to at least determine the cell identifier of the access points 110, 210, and 310. For example, this may help facilitate various neighboring access point measurements (e.g., CRS) that are based on knowledge of the cell identifier. Accordingly, in other designs, the first synchronization signals 402, 404, and 406 may instead be sent in accordance with an individual sequence to provide cell identification to legacy access terminals as well as other access terminals such as the access terminal 120, with the second synchronization signals 412, 414, and 416 being sent in accordance with a common sequence, frequency, and—to varying degrees—time.

Figure 5:
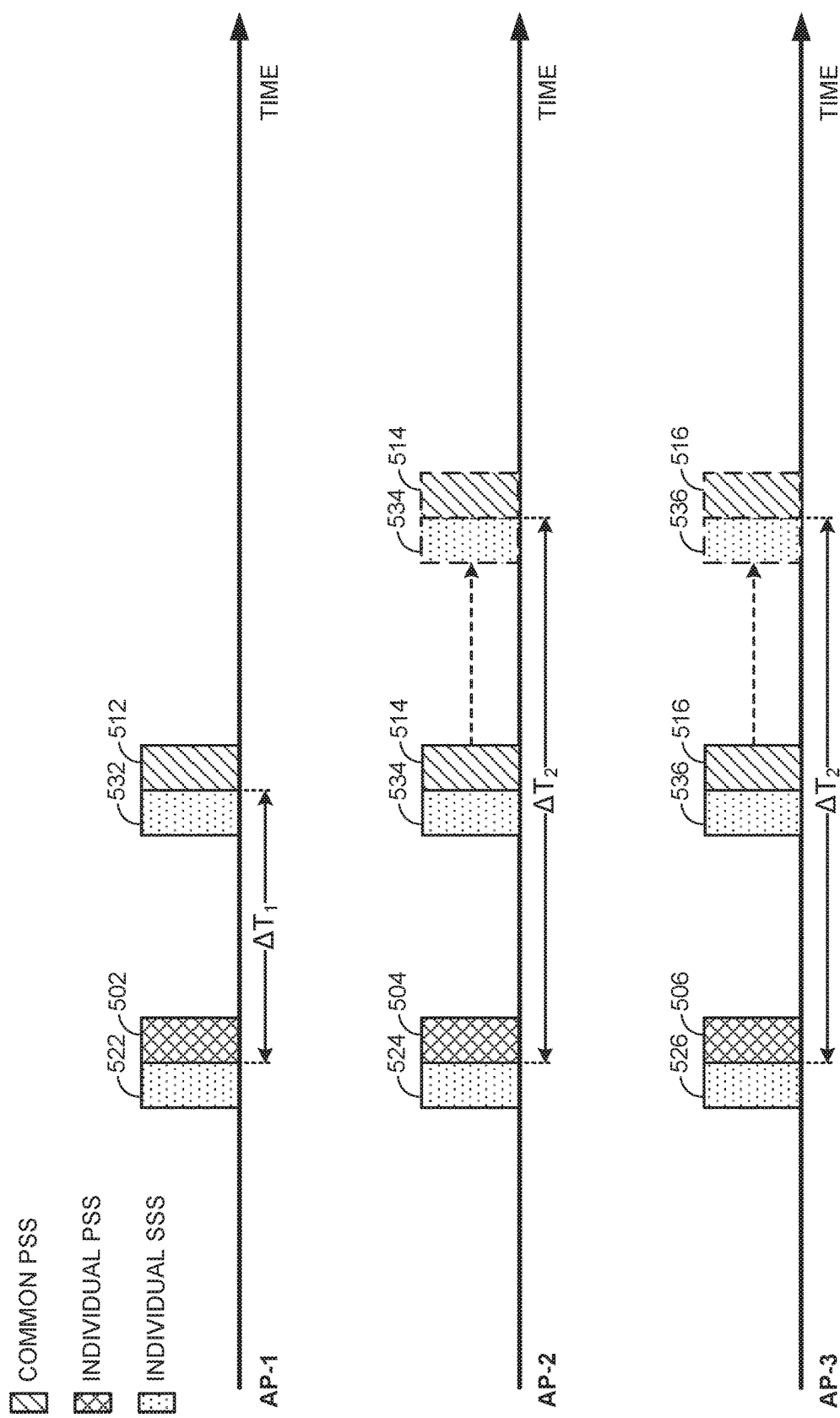
FIG. 5 is a timing diagram illustrating another example scheme for synchronization signaling among access points deployed by a common operator.

FIG. 5 is a timing diagram illustrating another example scheme for synchronization signaling among access points deployed by a common operator. In this example, the access point 110 (AP-1) is again deployed with the other access point 210 (AP-2) and the still other access point 310 (AP-3) for illustrations purposes.

As shown, in this design, each of the access points 110, 210, and 310 may initially broadcast an individual synchronization signal such as an individual PSS that is allowed to vary from access point to access point (e.g., in accordance with a cell identifier group, as discussed above). Similar to the design of FIG. 4, the access point 110 may again transmit a first synchronization signal 502, the access point 210 may transmit a first synchronization signal 504, and the access point 310 may transmit a first synchronization signal 506. However, the first synchronization signals 502, 504, and 506 may be sent here in accordance with individual sequences.

Subsequently, each of the access points 110, 210, and 310 may transmit a common synchronization signal following the individual synchronization signal. Similar to the design of FIG. 4, the access point 110 may transmit a second synchronization signal 512, the access point 210 may transmit a second synchronization signal 514, and the access point 310 may transmit a second synchronization signal 516. However, in contrast to the design of FIG. 4, the second synchronization signals 512, 514, and 516 may use a common sequence with respect to each other, although this sequence may again be a different sequence from the first synchronization signals 502, 504, and 506 to differentiate common synchronization signal instances from individual synchronization signal instances. It may also be outside of the sequence space recognized by legacy access terminals.

As shown, the common sequence of the second synchronization signals 512, 514, and 516 may provide a timing detection enhancement via the aforementioned SFN effect when transmitted at a common time. Conversely, as is further shown, the common sequence of the second synchronization signals 512, 514, and 516 may provide a cell identity resolution enhancement when transmitted in accordance with position modulation, as described in more detail above. The tradeoff between timing detection and cell identity resolution may be application- or deployment-specific. For example, in a dense deployment of access points where signal strength is likely to be high, it may be more beneficial to favor cell identity resolution enhancement. Conversely, in a sparse deployment of access points where signal strength is likely to be low, it may be more beneficial to favor timing detection enhancement.

As further illustrated in FIG. 5, similar to FIG. 4, each of the synchronization signals 502, 504, 506, 512, 514, and 516 may be accompanied by respective auxiliary synchronization signals 522, 524, 526, 532, 534, and 536 to convey additional synchronization information. In the illustrated example, each of the synchronization signals 502, 504, 506, 512, 514, and 516 are again shown by way of example as PSS and each of the auxiliary synchronization signals 522, 524, 526, 532, 534, and 536 are again shown by way of example as SSS.

Figure 6:
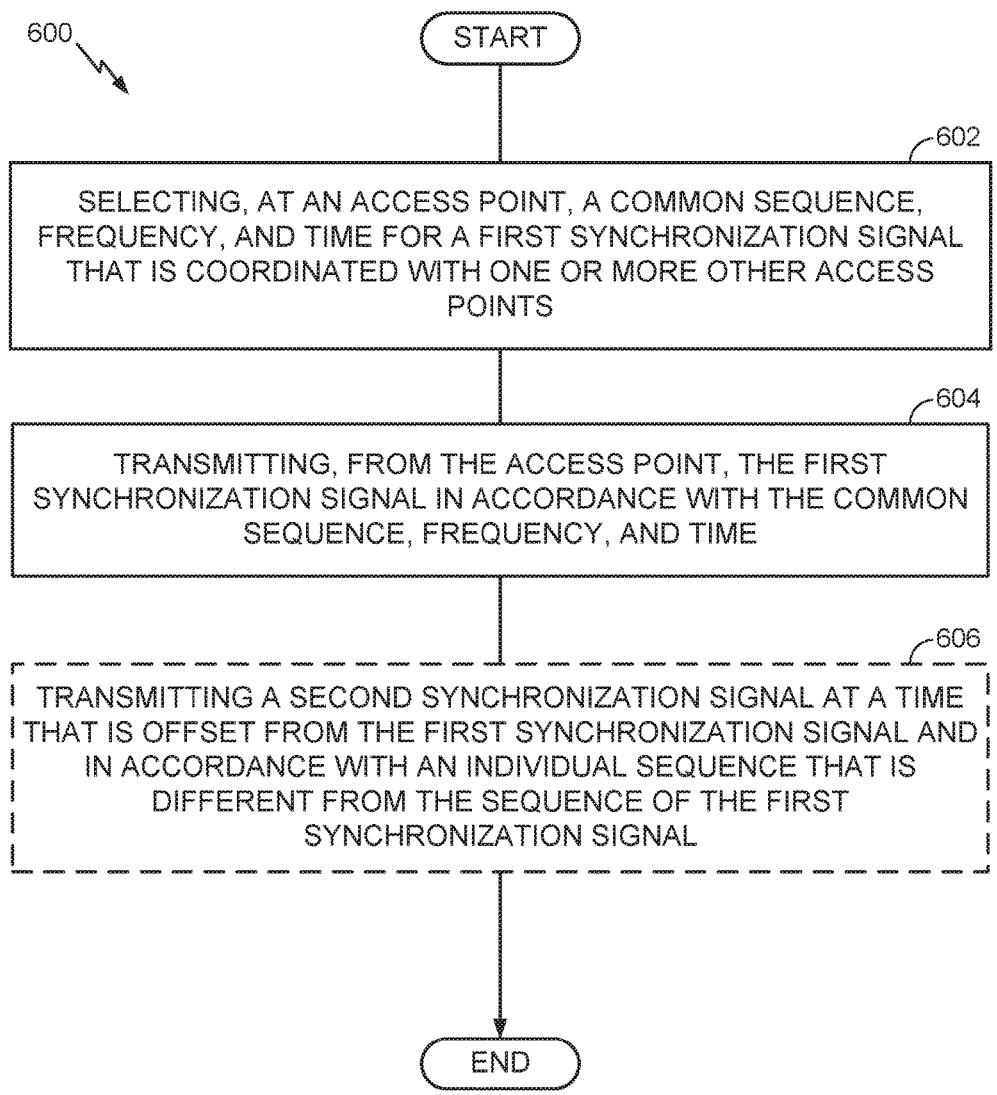
FIG. 6 is a flow diagram illustrating an example method of communication in accordance with the techniques described herein.

FIG. 6 is a flow diagram illustrating an example method of communication in accordance with the techniques described above. The method 600 may be performed, for example, by an access point (e.g., the access point 110 illustrated in FIG. 1) operating on a shared communication medium. As an example, the communication medium may include one or more time, frequency, or space resources on an unlicensed radio frequency band shared between LTE technology and Wi-Fi technology devices.

As shown, the access point may select a common sequence, frequency, and time for a first synchronization signal that is coordinated with one or more other access points (block 602). The access point may then transmit the first synchronization signal in accordance with the common sequence, frequency, and time (block 604). In some designs or scenarios, the access point may also transmit a second synchronization signal at a time that is offset from the first synchronization signal and in accordance with an individual sequence that is different from the sequence of the first synchronization signal (optional block 606).

As discussed in more detail above, the access point and the one or more other access points may be associated with a common operator. Further, a sequence value for the individual sequence may be selected that is outside of a set of values recognized by at least one access terminal configured to receive synchronization signals (e.g., legacy access terminals).

In some designs, the offset may be positive such that the second synchronization signal is transmitted after the first synchronization signal. In other designs, the offset may be negative such that the second synchronization signal is transmitted before the first synchronization signal. Further, the offset between the first synchronization signal and the second synchronization signal may be selected based on a cell identifier group associated with the access point or may be independent of a cell identifier group associated with the access point.

As an example, the first synchronization signal and the second synchronization signal may be PSSs. As another example, the first synchronization signal may be a PSS and the second synchronization signal may be an SSS.

Figure 7:
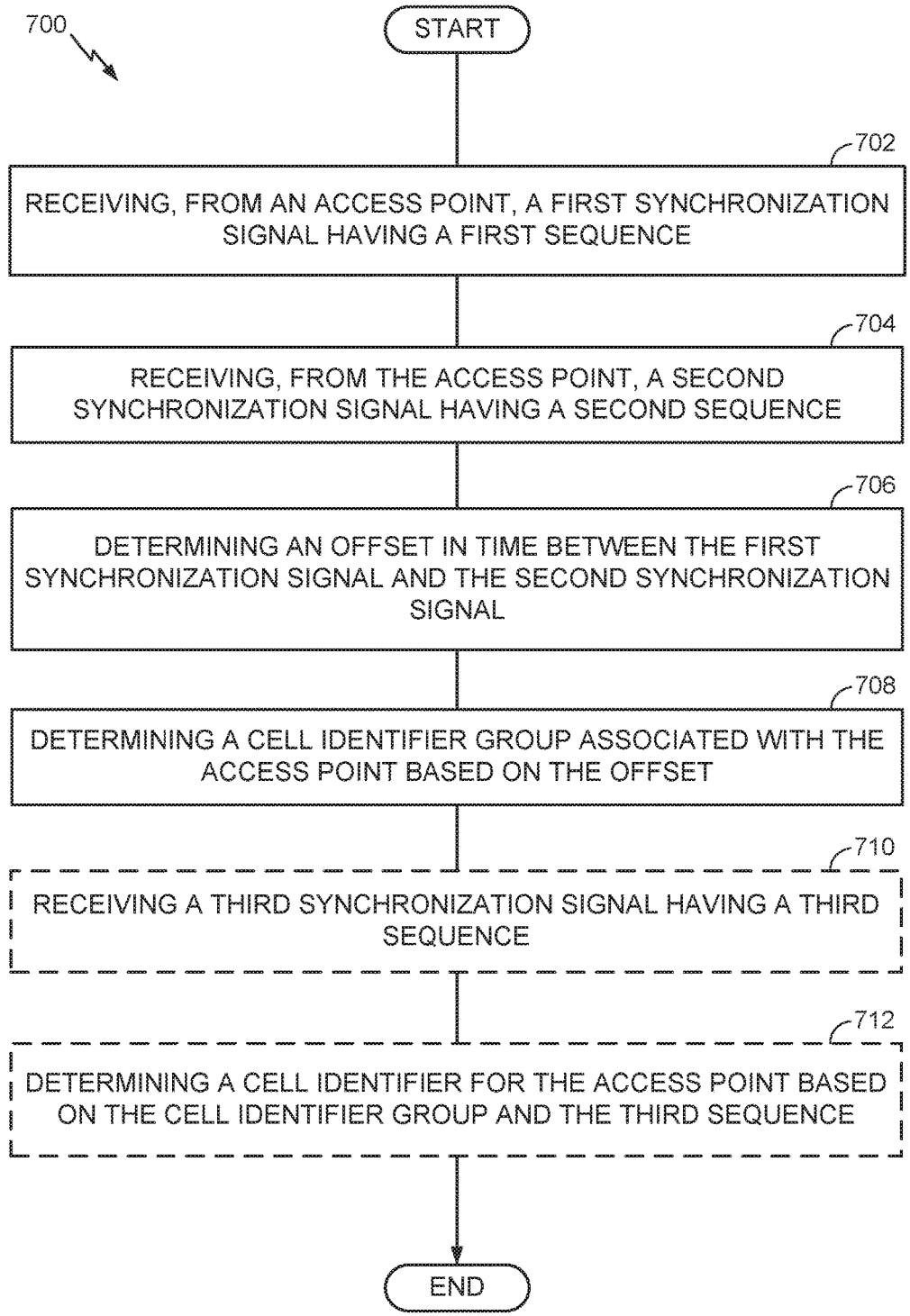
FIG. 7 is a flow diagram illustrating another example method of communication in accordance with the techniques described herein.

FIG. 7 is a flow diagram illustrating another example method of communication in accordance with the techniques described above. The method 700 may be performed, for example, by an access terminal (e.g., the access terminal 120 illustrated in FIG. 1) operating on a shared communication medium. As an example, the communication medium may include one or more time, frequency, or space resources on an unlicensed radio frequency band shared between LTE technology and Wi-Fi technology devices.

As shown, the access terminal may receive, from an access point, a first synchronization signal having a first sequence (block 702) and receive, from the access point, a second synchronization signal having a second sequence (block 704). The access terminal may then determine an offset in time between the first synchronization signal and the second synchronization signal (block 706) and determine a cell identifier group associated with the access point based on the offset (block 708).

In some designs, the first sequence may be a common sequence that is coordinated with at least one other access point and the second sequence may be an individual sequence that is different from the at least one other access point. In other designs, the first sequence may be an individual sequence that is different from at least one other access point and the second sequence may be a common sequence that is coordinated with the at least one other access point.

As is further shown in FIG. 7, the access terminal may also receive a third synchronization signal having a third sequence (optional block 710) and determine a cell identifier for the access point based on the cell identifier group and the third sequence (optional block 712). As an example, the first synchronization signal and the second synchronization signal may be PSSs and the third synchronization signal may be an SSS.

In some designs, the first synchronization signal may be received concurrently from at least one other access point, such as other access points that are associated with a common operator.

For generality, the access point 110 and the access terminal 120 are shown in FIG. 1 only in relevant part as including the synchronization signaling manager 112 and synchronization signaling manager 122, respectively. It will be appreciated, however, that the access point 110 and the access terminal 120 may be configured in various ways to provide or otherwise support the synchronization signaling coordination techniques discussed herein.

Figure 8:
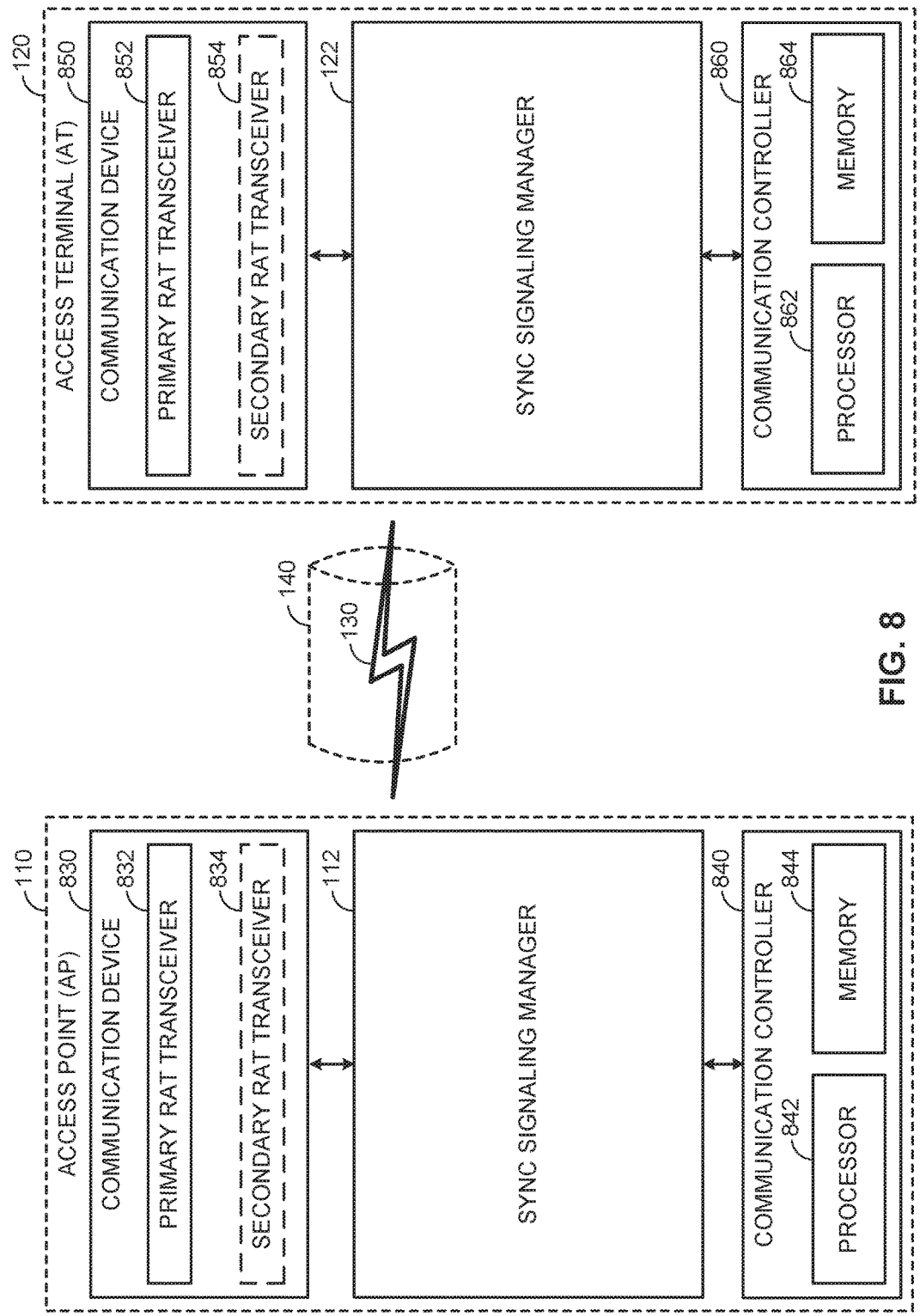
FIG. 8 is a device-level diagram illustrating example components of an access point and an access terminal in more detail.

FIG. 8 is a device-level diagram illustrating example components of the access point 110 and the access terminal 120 of the primary RAT system 100 in more detail. As shown, the access point 110 and the access terminal 120 may each generally include a wireless communication device (represented by the communication devices 830 and 850) for communicating with other wireless nodes via at least one designated RAT. The communication devices 830 and 850 may be variously configured for transmitting and encoding signals, and, conversely, for receiving and decoding signals in accordance with the designated RAT (e.g., messages, indications, information, pilots, and so on).

The communication devices 830 and 850 may include, for example, one or more transceivers, such as respective primary RAT transceivers 832 and 852, and, in some designs, (optional) co-located secondary RAT transceivers 834 and 854, respectively (corresponding, for example, to the RAT employed by the competing RAT system 150). As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a radio chip or similar circuitry providing low-level sniffing only). Further, as used herein, the term "co-located" (e.g., radios, access points, transceivers, etc.) may refer to one of various arrangements. For example, components that are in the same housing; components that are hosted by the same processor; components that are within a defined distance of one another; and/or components that are connected via an interface (e.g., an Ethernet switch) where the interface meets the latency requirements of any required inter-component communication (e.g., messaging).

The access point 110 and the access terminal 120 may also each generally include a communication controller (represented by the communication controllers 840 and 860) for controlling operation of their respective communication devices 830 and 850 (e.g., directing, modifying, enabling, disabling, etc.). The communication controllers 840 and 860 may include one or more processors 842 and 862, and one or more memories 844 and 864 coupled to the processors 842 and 862, respectively. The memories 844 and 864 may be configured to store data, instructions, or a combination thereof, either as on-board cache memory, as separate components, a combination, etc. The processors 842 and 862 and the memories 844 and 864 may be standalone communication components or may be part of the respective host system functionality of the access point 110 and the access terminal 120.

It will be appreciated that the synchronization signaling manager 112 and the synchronization signaling manager 122 may be implemented in different ways. In some designs, some or all of the functionality associated therewith may be implemented by or otherwise at the direction of at least one processor (e.g., one or more of the processors 842 and/or one or more of the processors 862), at least one memory (e.g., one or more of the memories 844 and/or one or more of the memories 864), at least one transceiver (e.g., one or more of the transceivers 832 and 834 and/or one or more of the transceivers 852 and 854), or a combination thereof. In other designs, some or all of the functionality associated therewith may be implemented as a series of interrelated functional modules.

Accordingly, it will be appreciated that the components in FIG. 8 may be used to perform operations described above with respect to FIGS. 1-7. For example, the access point 110 may select, via the processor 842 and the memory 844, a common sequence, frequency, and time for a first synchronization signal that is coordinated with one or more other access points. The access point 110 may then transmit, via the primary RAT transceiver 832, the first synchronization signal in accordance with the common sequence, frequency, and time. In some designs or scenarios, the access point 110 may also transmit, via the primary RAT transceiver 832, a second synchronization signal at a time that is offset from the first synchronization signal and in accordance with an individual sequence that is different from the sequence of the first synchronization signal.

As another example, the access terminal 120 may receive, via the primary RAT transceiver 852 from the access point 110, a first synchronization signal having a first sequence, and receive, via the primary RAT transceiver 852 from the access point 110, a second synchronization signal having a second sequence. The access terminal 120 may then determine, via the processor 862 and the memory 864, an offset in time between the first synchronization signal and the second synchronization signal, and determine, via the processor 862 and the memory 864, a cell identifier group associated with the access point 110 based on the offset. In some designs, the access terminal 120 may also receive, via the primary RAT transceiver 852, a third synchronization signal having a third sequence, and determine, via the processor 862 and the memory 864, a cell identifier for the access point 110 based on the cell identifier group and the third sequence.

Figure 9:
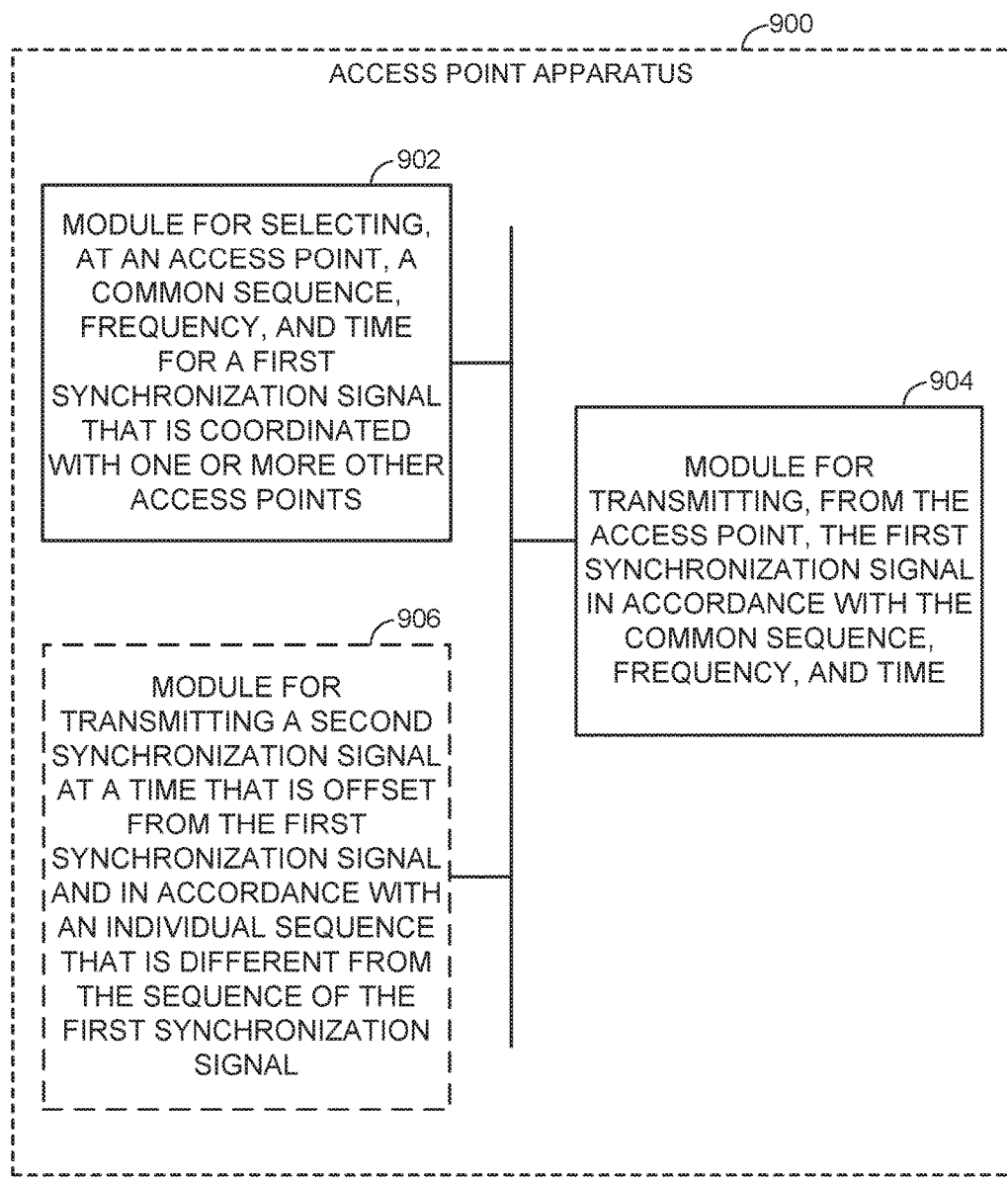
FIG. 9 illustrates an example apparatus represented as a series of interrelated functional modules.

FIG. 9 illustrates an example access point apparatus for implementing the synchronization signaling manager 112 represented as a series of interrelated functional modules. In the illustrated example, the apparatus 900 includes a module for selecting 902, a module for transmitting 904, and an (optional) module for transmitting 906.

The module for selecting 902 may be configured to select a common sequence, frequency, and time for a first synchronization signal that is coordinated with one or more other access points. The module for transmitting 904 may be configured to transmit the first synchronization signal in accordance with the common sequence, frequency, and time. The (optional) module for transmitting 906 may be configured to transmit a second synchronization signal at a time that is offset from the first synchronization signal and in accordance with an individual sequence that is different from the sequence of the first synchronization signal.

As discussed in more detail above, the access point and the one or more other access points may be associated with a common operator. Further, a sequence value for the individual sequence may be selected that is outside of a set of values recognized by at least one access terminal configured to receive synchronization signals (e.g., legacy access terminals).

In some designs, the offset may be positive such that the second synchronization signal is transmitted after the first synchronization signal. In other designs, the offset may be negative such that the second synchronization signal is transmitted before the first synchronization signal. Further, the offset between the first synchronization signal and the second synchronization signal may be selected based on a cell identifier group associated with the access point or may be independent of a cell identifier group associated with the access point.

As an example, the first synchronization signal and the second synchronization signal may be PSSs. As another example, the first synchronization signal may be a PSS and the second synchronization signal may be an SSS.

Figure 10:
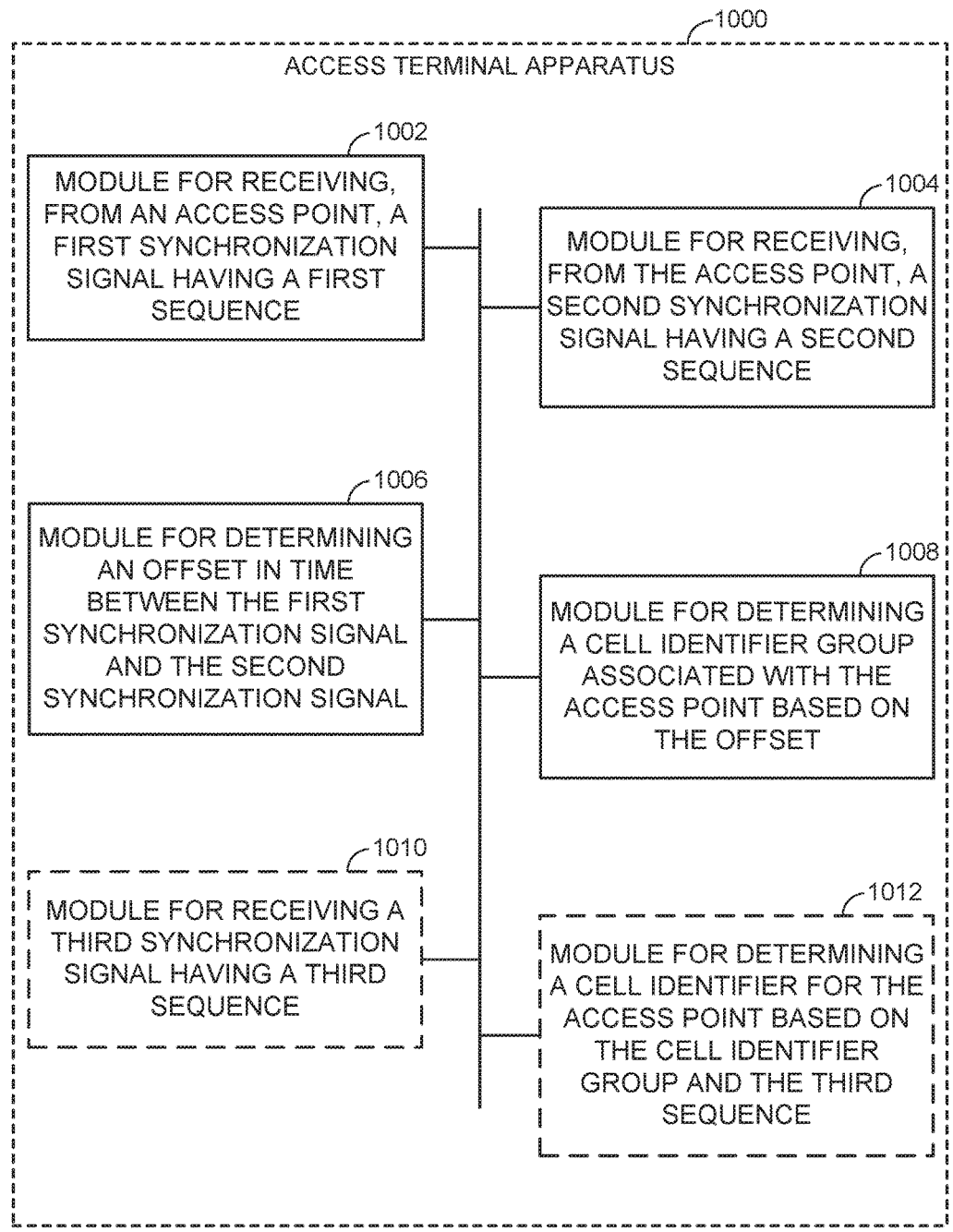
FIG. 10 illustrates an example apparatus represented as a series of interrelated functional modules.

FIG. 10 illustrates an example access terminal apparatus for implementing the synchronization signaling manager 122 represented as a series of interrelated functional modules. In the illustrated example, the apparatus 1000 includes a module for receiving 1002, a module for receiving 1004, a module for determining 1006, a module for determining 1008, an (optional) module for receiving 1010, and an (optional) module for determining 1006.

The module for receiving 1002 may be configured to receive, from an access point, a first synchronization signal having a first sequence. The module for receiving 1004 may be configured to receive, from the access point, a second synchronization signal having a second sequence. The module for determining 1006 may be configured to determine an offset in time between the first synchronization signal and the second synchronization signal. The module for determining 1008 may be configured to determine a cell identifier group associated with the access point based on the offset.

In some designs, the first sequence may be a common sequence that is coordinated with at least one other access point and the second sequence may be an individual sequence that is different from the at least one other access point. In other designs, the first sequence may be an individual sequence that is different from at least one other access point and the second sequence may be a common sequence that is coordinated with the at least one other access point.

Returning to FIG. 10, the (optional) module for receiving 1010 may be configured to receive a third synchronization signal having a third sequence. The (optional) module for determining 1012 may be configured to determine a cell identifier for the access point based on the cell identifier group and the third sequence. As an example, the first synchronization signal and the second synchronization signal may be PSSs and the third synchronization signal may be an SSS.

In some designs, the first synchronization signal may be received concurrently from at least one other access point, such as other access points that are associated with a common operator.

The functionality of the modules of FIGS. 9-10 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIGS. 9-10, as well as other components and functions described herein, may be implemented using any suitable means. Such means also may be implemented, at least in part, using corresponding structure as taught herein. For example, the components described above in conjunction with the "module for" components of FIGS. 9-10 also may correspond to similarly designated "means for" functionality. Thus, in some aspects one or more of such means may be implemented using one or more of processor components, integrated circuits, or other suitable structure as taught herein, including as an algorithm. One skilled in the art will recognize in this disclosure an algorithm represented in the prose described above, as well in sequences of actions that may be represented by pseudocode. For example, the components and functions represented by FIGS. 9-10 may include code for performing a LOAD operation, a COMPARE operation, a RETURN operation, an IF-THEN-ELSE loop, and so on.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, one skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in Random-Access Memory (RAM), flash memory, Read-only Memory (ROM), Erasable Programmable Read-only Memory (EPROM), Electrically Erasable Programmable Read-only Memory (EEPROM), registers, hard disk, a removable disk, a CD-ROM, or any other form of storage medium known in the art, transitory or non-transitory. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a transitory or non-transitory computer-readable medium embodying a method for communication.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A communication method, comprising:
    selecting, at an access point, a common sequence, frequency, and time for a first synchronization signal that is coordinated with one or more other access points;
    transmitting, from the access point, on a wireless communication medium shared by a plurality of radio access technology systems, the first synchronization signal in accordance with the common sequence, frequency, and time; and
    transmitting, from the access point, on the wireless communication medium shared by the plurality of radio access technology systems, a second synchronization signal at a time that is offset from the first synchronization signal and in accordance with an individual sequence that is different from the common sequence of the first synchronization signal, wherein a sequence value is selected for the individual sequence that is outside of a set of values recognized by at least one access terminal configured to receive synchronization signals.

2. The method of claim 1, wherein the access point and the one or more other access points are associated with a common operator.

3. The method of claim 1, further comprising selecting the offset between the first synchronization signal and the second synchronization signal based on a cell identifier group associated with the access point.

4. The method of claim 1, wherein the offset is positive such that the second synchronization signal is transmitted after the first synchronization signal.

5. The method of claim 1, wherein the offset is negative such that the second synchronization signal is transmitted before the first synchronization signal.

6. The method of claim 5, further comprising selecting the offset between the first synchronization signal and the second synchronization signal based on a cell identifier group associated with the access point.

7. The method of claim 5, further comprising selecting the offset between the first synchronization signal and the second synchronization signal independent of a cell identifier group associated with the access point.

8. The method of claim 1, wherein (i) the first synchronization signal and the second synchronization signal are Primary Synchronization Signals (PSSs) or (ii) the first synchronization signal is a PSS and the second synchronization signal is a Secondary Synchronization Signal (SSS).

9. The method of claim 1, wherein the first synchronization signal is transmitted from the access point using the same sequence, at the same frequency, and at the same time as a synchronization signal from the one or more other access points.

10. The method of claim 1, wherein the access point operates within a first radio access technology system of the plurality of radio access technology systems, and wherein the first synchronization signal and the second synchronization signal comprise control signals that facilitate operation of the first radio access technology system.

11. The method of claim 10, wherein the control signals comprise information related to timing synchronization, system acquisition, interference measurements, tracking loops, gain control, paging, or any combination thereof.

12. The method of claim 1, wherein the at least one access terminal comprises a legacy access terminal.

13. A communication apparatus, comprising:
at least one processor;
at least one memory coupled to the at least one processor, the at least one processor and the at least one memory being configured to select, at an access point, a common sequence, frequency, and time for a first synchronization signal that is coordinated with one or more other access points; and
at least one transceiver configured to:
transmit, from the access point, on a wireless communication medium shared by a plurality of radio access technology systems, the first synchronization signal in accordance with the common sequence, frequency, and time; and
transmit, from the access point, on the wireless communication medium shared by the plurality of radio access technology systems, a second synchronization signal at a time that is offset from the first synchronization signal and in accordance with an individual sequence that is different from the common sequence of the first synchronization signal, wherein a sequence value is selected for the individual sequence that is outside of a set of values recognized by at least one access terminal configured to receive synchronization signals.

14. The apparatus of claim 13, wherein the access point and the one or more other access points are associated with a common operator.

15. The apparatus of claim 13, wherein the at least one processor and the at least one memory are further configured to select the offset between the first synchronization signal and the second synchronization signal based on a cell identifier group associated with the access point.

16. The apparatus of claim 13, wherein the offset is positive such that the second synchronization signal is transmitted after the first synchronization signal.

17. The apparatus of claim 13, wherein the offset is negative such that the second synchronization signal is transmitted before the first synchronization signal.

18. The apparatus of claim 17, wherein the at least one processor and the at least one memory are further configured to select the offset between the first synchronization signal and the second synchronization signal based on a cell identifier group associated with the access point.

19. The apparatus of claim 17, wherein the at least one processor and the at least one memory are further configured to select the offset between the first synchronization signal and the second synchronization signal independent of a cell identifier group associated with the access point.

20. The apparatus of claim 13, wherein (i) the first synchronization signal and the second synchronization signal are Primary Synchronization Signals (PSSs) or (ii) the first synchronization signal is a PSS and the second synchronization signal is a Secondary Synchronization Signal (SSS).

21. The apparatus of claim 13, wherein the at least one transceiver is configured to transmit the first synchronization signal from the access point using the same sequence, at the same frequency, and at the same time as a synchronization signal from the one or more other access points.

22. A communication apparatus, comprising:
means for selecting, at an access point, a common sequence, frequency, and time for a first synchronization signal that is coordinated with one or more other access points;
means for transmitting, from the access point, on a wireless communication medium shared by a plurality of radio access technology systems, the first synchronization signal in accordance with the common sequence, frequency, and time, and
means for transmitting, from the access point, on the wireless communication medium shared by the plurality of radio access technology systems, a second synchronization signal at a time that is offset from the first synchronization signal and in accordance with an individual sequence that is different from the common sequence of the first synchronization signal, wherein a sequence value is selected for the individual sequence that is outside of a set of values recognized by at least one access terminal configured to receive synchronization signals.

23. The apparatus of claim 22, wherein the access point and the one or more other access points are associated with a common operator.

24. The apparatus of claim 22, further comprising means for selecting the offset between the first synchronization signal and the second synchronization signal based on a cell identifier group associated with the access point.

25. The apparatus of claim 22, wherein the offset is positive such that the second synchronization signal is transmitted after the first synchronization signal.

26. The apparatus of claim 22, wherein the offset is negative such that the second synchronization signal is transmitted before the first synchronization signal.

27. The apparatus of claim 26, further comprising means for selecting the offset between the first synchronization signal and the second synchronization signal based on a cell identifier group associated with the access point.

28. The apparatus of claim 26, further comprising means for selecting the offset between the first synchronization signal and the second synchronization signal independent of a cell identifier group associated with the access point.

29. The apparatus of claim 22, wherein (i) the first synchronization signal and the second synchronization signal are Primary Synchronization Signals (PSSs) or (ii) the first synchronization signal is a PSS and the second synchronization signal is a Secondary Synchronization Signal (SSS).

30. The apparatus of claim 22, wherein the means for transmitting comprises means for transmitting the first synchronization signal from the access point using the same sequence, at the same frequency, and at the same time as a synchronization signal from the one or more other access points.

31. A non-transitory computer-readable medium comprising code, which, when executed by a processor, causes the processor to perform operations for communication, the non-transitory computer-readable medium comprising:
   code instructing an access point to select a common sequence, frequency, and time for a first synchronization signal that is coordinated with one or more other access points;
   code instructing the access point to transmit, on a wireless communication medium shared by a plurality of radio access technology systems, the first synchronization signal in accordance with the common sequence, frequency, and time; and
   code instructing the access point to transmit, on the wireless communication medium shared by the plurality of radio access technology systems, a second synchronization signal at a time that is offset from the first synchronization signal and in accordance with an individual sequence that is different from the common sequence of the first synchronization signal, wherein a sequence value is selected for the individual sequence that is outside of a set of values recognized by at least one access terminal configured to receive synchronization signals.

32. The non-transitory computer-readable medium of claim 31, wherein the access point and the one or more other access points are associated with a common operator.

33. The non-transitory computer-readable medium of claim 31, further comprising code for selecting the offset between the first synchronization signal and the second synchronization signal based on a cell identifier group associated with the access point.

34. The non-transitory computer-readable medium of claim 31, wherein the offset is positive such that the second synchronization signal is transmitted after the first synchronization signal.

35. The non-transitory computer-readable medium of claim 31, wherein the offset is negative such that the second synchronization signal is transmitted before the first synchronization signal.

36. The non-transitory computer-readable medium of claim 35, further comprising code for selecting the offset between the first synchronization signal and the second synchronization signal based on a cell identifier group associated with the access point.

37. The non-transitory computer-readable medium of claim 35, further comprising code for selecting the offset between the first synchronization signal and the second synchronization signal independent of a cell identifier group associated with the access point.

38. The non-transitory computer-readable medium of claim 31, wherein (i) the first synchronization signal and the second synchronization signal are Primary Synchronization Signals (PSSs) or (ii) the first synchronization signal is a PSS and the second synchronization signal is a Secondary Synchronization Signal (SSS).

39. The non-transitory computer-readable medium of claim 31, wherein the code for transmitting comprises code for transmitting the first synchronization signal from the access point using the same sequence, at the same frequency, and at the same time as a synchronization signal from the one or more other access points.

* * * * *